(No Model.)

E. W. TAYLOR.
NUT LOCK.

No. 475,094.  Patented May 17, 1892.

Witnesses:
C. H. Raeder
A. F. Matthews

Inventor
Edward W. Taylor,
By James Sheehy
Attorney

THE NORRIS PETERS CO., PHOTO-LITHO., WASHINGTON, D. C.

UNITED STATES PATENT OFFICE.

EDWARD W. TAYLOR, OF SALT LAKE CITY, UTAH TERRITORY.

NUT-LOCK.

SPECIFICATION forming part of Letters Patent No. 475,094, dated May 17, 1892.

Application filed February 24, 1891. Serial No. 382,501. (No model.)

*To all whom it may concern:*

Be it known that I, EDWARD W. TAYLOR, a citizen of the United States, residing at Salt Lake City, in the county of Salt Lake and Territory of Utah, have invented certain new and useful Improvements in Devices for Locking Nuts Upon Bolts; and I do hereby declare the following to be a full, clear, and exact description of the invention, such as will enable others skilled in the art to which it appertains to make and use the same.

This invention relates to a device for locking nuts on bolts; and it has for its object the provision of means at a minimum expense whereby a nut may be locked upon a bolt from movement in either a backward or forward direction, and may allow the nut to turn in one direction and lock the same from movement in an opposite direction only when desired.

A further object of the invention is to adapt the improvements for use on a right or left hand threaded nut and bolt, and a further object is to provide means for insuring a proper action of the locking devices and retain the locking key or keys in their seats, so as to prevent them from being casually displaced.

The invention will be fully understood from the following description and claim, when taken in connection with the annexed drawings, in which—

Figure 1:
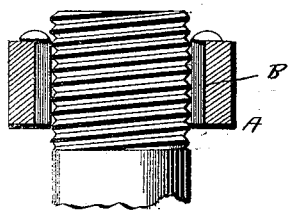
Figure 4:
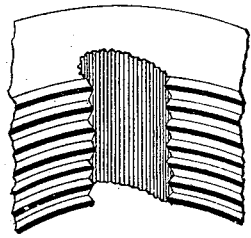
Figure 2:
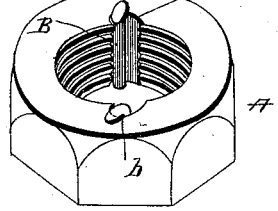
Figure 5:
Figure 3:
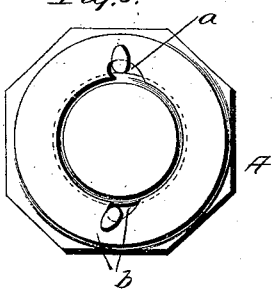

Figure 1 is a diametrical section of a nut embodying my improvements, the same being illustrated as applied to a part of a bolt. Fig. 2 is a perspective view of the nut removed, with the locking-keys in position. Fig. 3 is a plan view of the nut, showing the bolt and two of the keys applied. Fig. 4 is a perspective detail view of the nut, illustrating one of the beveled or cam-faced grooves for the reception of the locking keys or pin; and Fig. 5 is a view of one of the keys or pins removed.

Referring by letter to said drawings, A indicates a nut, which may be of rectangular or other suitable form in outline and provided with the usual screw tapped or threaded bore, as shown. This nut is provided at a suitable point within its threaded bore with a beveled or cam-faced groove *a*. This groove, which extends across the threads in the nut and from one side to the other thereof, is of such a depth at its deepest portion as to permit a key or locking-pin to be placed therein and barely touch the threads of the bolt when the nut has been turned, but to engage or contact with the threads of said bolt sufficiently to be carried up the beveled or cam face of the groove or recess and bind therein to form a lock between the nut and bolt. It is desirable, in order to more effectively retain the locking key or pin in position, to provide the recesses with a roughened surface or file-like teeth, which extend the entire length of the groove or recesses, as better shown in Fig. 4 of the drawings.

B indicates the locking key or pin. This pin, which is formed of metal, may be of any suitable shape in cross-section, although it is preferable to have it of a circular form, and in order to work more effectively this pin or key may be also roughened or provided with file-like teeth extending lengthwise, as shown.

*b* indicates a groove or recess in the threaded bore of the nut, which is of a shape and form the same as the groove *a* and arranged in a reverse manner thereto. This groove *b*, which is arranged reversely to the groove *a* and is designed to work as a lock in a reverse direction, is here illustrated at a point diametrically opposite to the groove or recess *a*, although it is obvious that it may be placed at any suitable point in the threaded bore.

From the construction shown and described it will be seen that in using a right-hand-threaded nut, when it is desirable to lock said nut from backward movement, it is simply necessary to use a key in the groove *a*. When it is desirable to use a left-hand-threaded nut, it is simply necessary to use a key in the groove *b* to prevent unturning or backward movement, and when it is desirable to use either a right or left hand threaded nut and prevent the same from turning in either direction after it has been screwed home both keys should be used.

The locking-key which I have shown is provided with an angular branch or head at one end, and when the keys or key have been placed in position they may be better held in their seats by upsetting a part of the face of the nut against the head of the key.

Having described my invention, what I claim is—

The combination, with a bolt, of a nut provided with two beveled grooves in its threaded bore on opposite faces thereof, each having its cam-face arranged reversely to the other, and pins or keys adapted to be inserted in said grooves to engage said faces and lock the nut from movement on the bolt in either direction, substantially as specified.

In testimony that I claim the foregoing as my invention I affix my signature in the presence of two witnesses.

EDWARD W. TAYLOR.

Witnesses:
F. M. ULMER,
J. T. BRECKON.